(12) United States Patent
Rinne et al.

(10) Patent No.: US 6,201,966 B1
(45) Date of Patent: Mar. 13, 2001

(54) ALLOCATING IDLE TIME TO A MOBILE STATION

(75) Inventors: Mika Rinne, Espoo; Matti Jokimies, Salo; Mika Raitola, Espoo, all of (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/111,936

(22) Filed: Jul. 8, 1998

(30) Foreign Application Priority Data

Jul. 14, 1997 (FI) .................................................. 972984

(51) Int. Cl.[7] ................................................... H04Q 7/20
(52) U.S. Cl. ........................... 455/434; 455/437; 455/574
(58) Field of Search .................... 455/432, 434, 455/437, 443, 448, 515, 525, 572, 574, 67.1, 68, 69, 70, 32.1, 38.3, 343, 558; 370/311, 332, 348

(56) References Cited

U.S. PATENT DOCUMENTS

| | | |
|---|---|---|
| 5,345,448 | 9/1994 | Keskitalo . |
| 5,410,733 | 4/1995 | Niva et al. . |
| 5,483,668 | 1/1996 | Malkamaki et al. . |
| 5,524,009 | 6/1996 | Tuutijarvi et al. . |
| 5,659,598 | 8/1997 | Byrne et al. . |
| 5,678,192 * | 10/1997 | Paavonen et al. ................... 455/38.3 |
| 5,710,974 | 1/1998 | Granlund et al. . |
| 5,710,975 * | 1/1998 | Bernhardt et al. ................... 455/574 |
| 5,774,809 | 6/1998 | Tuutijarvi et al. . |

FOREIGN PATENT DOCUMENTS

WO97/15169   4/1997   (WO) .

OTHER PUBLICATIONS

Finnish Search Report.
"The GSM System For Mobile Communications" Mouly et al., ISBN 2-9507190-0-7, Palaiseau 1992.

* cited by examiner

Primary Examiner—Reinhard J. Eisenzopf
Assistant Examiner—Lester G. Kincaid
(74) Attorney, Agent, or Firm—Perman & Green, LLP

(57) ABSTRACT

A mobile station (10) can request (100) idle time from a network (20) e.g. for measuring the strengths of signals from base stations. Having received the request the network checks (110) whether suitable idle time is coming up and if not, allocates (120) idle time according to the request by the mobile station. Finally, the network informs (130) the mobile station about when and how much the mobile station has measurement time available.

32 Claims, 9 Drawing Sheets

ALLOCATING IDLE TIME TO A MOBILE STATION

TECHNICAL FIELD OF THE INVENTION

The invention relates to mobile communication systems, more specifically to the timing of various functions of a mobile station.

BACKGROUND OF THE INVENTION

Current mobile communication systems such as the GSM system are typically based on a cellular structure. While moving, mobile stations (MS) often cross cell boundaries and at the same time change base stations, i.e. perform a handover. A handover requires complex preparations, including e.g. synchronisation to the frequency and transmission sequence of the new base station. Synchronisation, in turn, requires that the nearby base stations be monitored and listened to. In the GSM system, a mobile station regularly monitors several base stations and typically transmits to the network the signal strength information of the six best base stations. However, mobile stations do not employ two receivers, which would facilitate continuous monitoring of nearby base stations, because two receivers would mean considerably higher complexity and manufacturing costs for the mobile station. Therefore, the mobile station needs free time for carrying out measurements. In the GSM system this is solved by having a pause at every 26th frame on the TCH/F channel transferring speech so that the mobile station has about 6 ms to make measurements. Such a frame is called an idle frame. The pause is repeated at 120 ms intervals. In addition, during the same 120-ms period there are several pauses of about 1 ms and 2 ms between the transmission and reception turns of the mobile station and base station. In the GSM system, base stations transmit synchronisation data on special synchronisation (SCH) and frequency control (FCCH) channels. These channels are repeated at certain intervals in time slots 0. However, a mobile station connected with another base station may have a reception turn at the same time since in the GSM system the base stations are not synchronised with each other. Therefore, the mobile station needs a longer pause, or a whole idle frame to receive the synchronisation data, for which these short, 1-ms and 2-ms pauses are not long enough. These short pauses, however, can be used for measuring the signal strengths of the neighbouring base stations. The GSM system and its channel architecture, among other things, are discussed in greater detail e.g. in "The GSM System for Mobile Communications" by Michel Mouly and Marie-Bernadette Pautet, ISBN 2-9507190-0-7, Palaiseau 1992. However, the use of the idle frame does not guarantee a fast enough synchronisation to a new cell in new evolving mobile communication systems that will be discussed below.

New mobile communication systems under development such as the universal mobile telephone system (UMTS) put more demands on the mobile stations. For example, future systems will employ cells of several different hierarchy levels from very small microcells covering possibly only one block to macro cells covering tens of kilometers. In such a system, the smaller cells of lower hierarchy levels will be used by slowly-moving mobile stations and terminals requiring high transmission rates. Small cell size facilitates high transmission capacity and hence new services, such as transmission of video images. Microcells are densely located and typically overlapping, so typically a mobile station changing channels can choose from several cells that in practice offer connections of equally good quality. Mobile stations moving fast, e.g. in a car, use larger cells of a higher hierarchy level because if they used microcells they would be compelled to change base stations very frequently. In addition, macro cells cover the shadow areas possibly left by the microcells. Such a multiple-level cell system requires that a mobile station has to regularly monitor very many base stations on almost all cell hierarchy levels.

From the user's standpoint it is advantageous if the mobile station is capable of operating flexibly in more than one parallel mobile communication system, e.g. in the GSM system and in the DCS 1800 system. Presently, DCS 1800 systems are being constructed to alleviate the traffic problem in high-density areas, such as city centres. There may also be more than two parallel systems in the future. For a mobile station to be able to change from a base station of one system to a base station of another system it has to regularly monitor the nearby base stations of that other system as well. The monitoring is made more difficult by the fact that the systems may be synchronised in different ways: precisely synchronised, loosely synchronised within certain limits, or fully asynchronous. If the base station to be monitored belongs to an asynchronous system, the mobile station needs more measuring time than usual because it has no information on when the asynchronous base station will transmit the identification signal to be monitored.

In mobile communication systems, communications can be roughly categorised into two classes: real time (RT) connections and non-real time (NRT) connections. RT traffic typically consists of speech or e.g. video images where no interruptions or delays are allowed. NRT, or packet, communications may include e.g. file transfers where interruptions and delays are permitted. The RT class is typically divided into two sub-classes, namely, short-delay RT connections and long-delay RT connections. Typically, up to 100-ms delays are allowed in the long-delay RT connections. The long-delay RT connections are suitable for the transmission of video images, for example. The short-delay RT connections are used for transmitting speech. So, the quality of active connections affects the requirements on the mobile station in connection with a handover. If a mobile station has only NRT connections, a momentary interruption in conjunction with a handover is not harmful. If, however, there exist between the mobile station and the old base station one or more RT connections, the handover must be performed very quickly and without disturbances.

Solutions according to the prior art, such as those used in the GSM system, do not additionally facilitate monitoring of the necessary number of base stations as the network architecture of the mobile communication system gets more complex and as the parallel use of more than one mobile communication system becomes more general.

SUMMARY OF THE INVENTION

An object of the invention is to provide a method for facilitating the realisation of necessary measurements. Another object of the invention is to provide a method with which a mobile station is allocated idle time it needs for measurements or other purposes. A further object of the invention is to provide a mobile station and communications network using the method according to the objects mentioned above.

The objects are achieved by arranging a mobile station to request a certain length of idle time in a certain period of time from a network, after which the network checks if it can provide such idle time, and if it can, the network provides the mobile station with the idle time it requested, and the network informs the mobile station when and how much idle time the mobile station has at its disposal.

The method according to the invention is characterised in that it comprises at least steps wherein a mobile station sends to the network an idle time request, and the network informs the mobile station about the idle time available.

The mobile station according to the invention is characterised in that it is arranged so as to send to the network a request for idle time and receive from the network information about the idle time available to the mobile station.

The communications network according to the invention is characterised in that it is arranged so as to receive from at least one mobile station a request for idle time, allocate in response to the reception of said request to the mobile station at least part of the idle time requested by the mobile station, and send to the mobile station information about the idle time available to the mobile station.

Using the method according to the invention a mobile station can ask the network to arrange idle time e.g. for the measurement of the strengths of signals from base stations or for the synchronisation to a neighbouring base station. Having received the request the network checks whether available idle time is coming up soon and if not, arranges so that the length of time requested by the mobile station is freed. Finally, the network tells the mobile station when and how much the mobile station has measurement time available.

BRIEF DESCRIPTION OF THE DRAWINGS

The invention is described in more detail with reference to the preferred embodiments presented by way of example and to the accompanying drawing wherein.

Like elements in the Figures are denoted by like reference designators.

DETAILED DESCRIPTION

Figure 1:
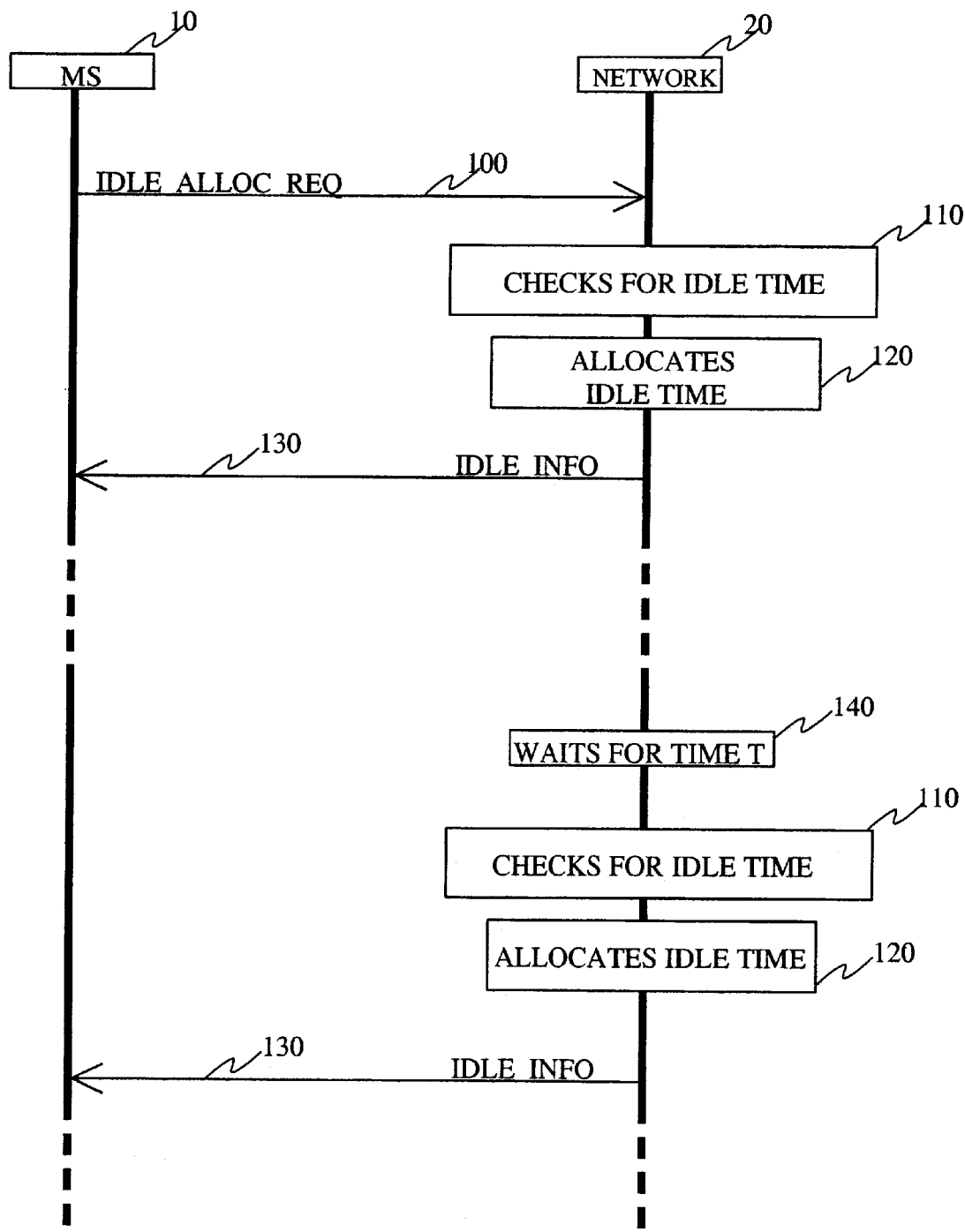
FIG. 1 shows signalling according to an embodiment of the invention.

FIG. 1 illustrates the operation of a method according to a preferred embodiment of the invention. First, a mobile station 10 sends 100 to the network 20 the message IDLE_ALLOC_REQ with which the mobile station requests the network to allocate idle time. Preferably the mobile station indicates in the message how much idle time it needs and within which time it needs the idle time. Having received the message the network 20 checks 110 whether a suitable pause is coming up in the communication between the mobile station and the network. If such a pause is not coming up, the network allocates 120 to the mobile station a pause that matches the mobile station's request as well as possible. Then the network sends an IDLE_INFO message to the mobile station, telling it how much and when it will have idle time at its disposal.

In connection with an IDLE_ALLOC_REQ message or another corresponding message the mobile station can put many kinds of different requests to the network. As was mentioned above, the mobile station preferably indicates how much idle time it needs and within which period of time it needs the idle time. Additionally, the mobile station may indicate that it also needs idle time later on, in which case it may indicate e.g. a certain period of time T after which the network shall allocate to the mobile station the indicated amount of idle time. Such an embodiment is illustrated by the end part of FIG. 1, wherein after the transmission of the first IDLE_INFO message the network waits 140 for the desired time T, whereafter the network repeats the idle time checking step 110 and the idle time allocating step 120 and informs 130 the mobile station about the new allocated idle period of time. The network may repeat the steps 140, 110 and 120 at desired intervals for the whole duration of the connection or e.g. for a certain number of times, as requested by the mobile station.

Figure 2:
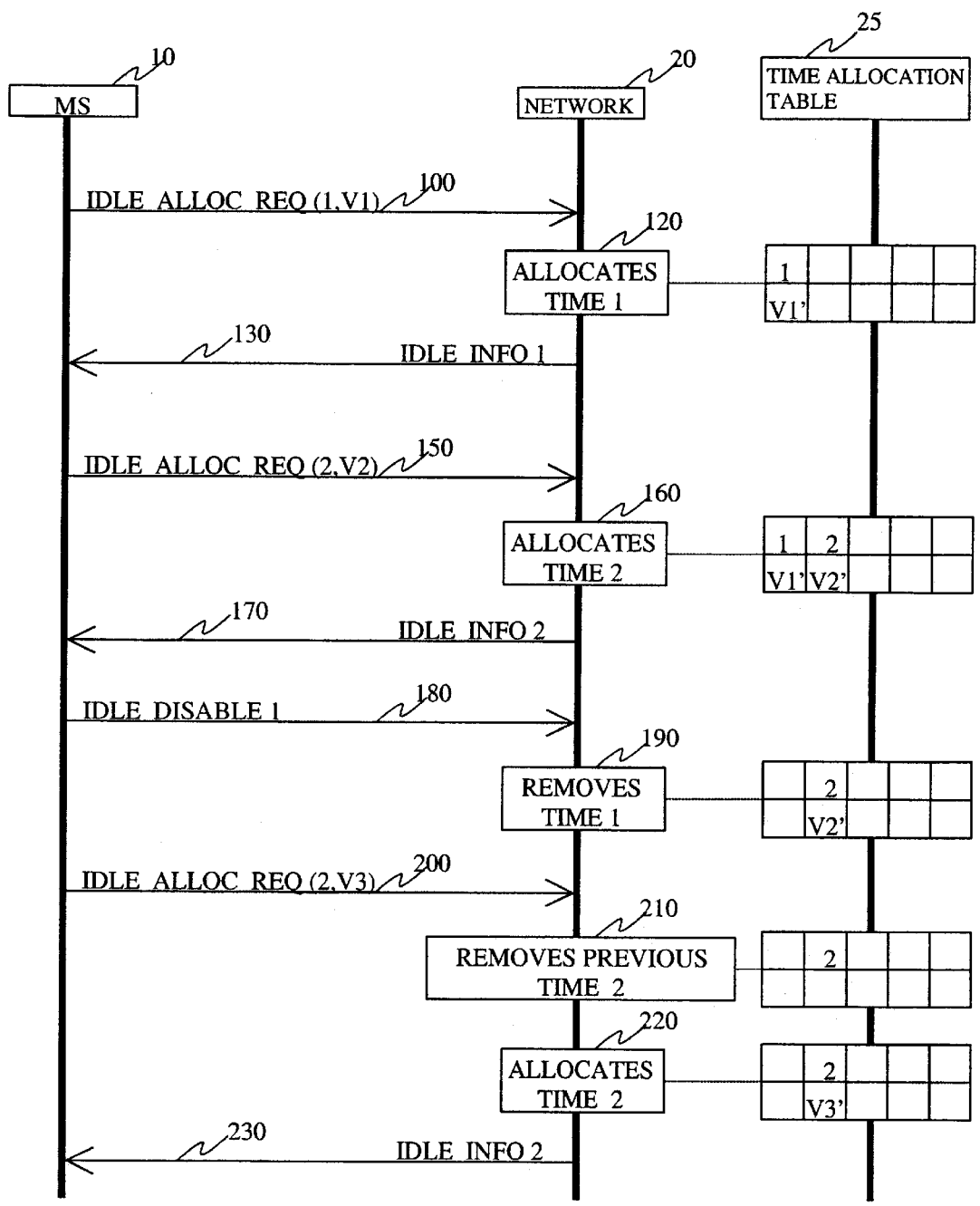
FIG. 2 shows signalling according to a second embodiment of the invention.

FIG. 2 shows an example of communications according to a second preferred embodiment of the invention. In this embodiment, more than one idle time requests may be in force at the same time. FIG. 2 also illustrates how a mobile station can end the recurrence of repeated idle time it requested earlier. In the example of FIG. 2, a mobile station 10 sends 100 to the network 20 a request for idle time IDLE_ALLOC_REQ and attaches to the request an identification code 1 and the necessary specification of the idle time V1. The network allocates 120 idle time to the mobile station as requested and stores into its memory 25 the identification code of the request and the specification V1' of the idle time allocated on the basis of the request. Advantageously the network can store this information e.g. in a time allocation table 25 maintained by a base station communicating with the mobile station. After that, the network informs 130 the mobile station about the allocated time using an IDLE_INFO message. In the example of FIG. 2 the mobile station needs later on more idle time and therefore it sends 150 to the network a new request for idle time IDLE_ALLOC_REQ to which it attaches the identification code 2 of the new request and the specification V2 of the idle time requested. The network provides 160 the idle time 2 requested by the mobile station and adds the data about the idle time to the time allocation table 25. Then the network sends 170 to the mobile station the information about the idle time allocated in an IDLE_INFO message. After that the mobile station sends 180 to the network an IDLE_DISABLE message to which the mobile station attaches the identification code 1 of the idle time to be deleted. In response to the reception of the IDLE_DISABLE message the network deletes the idle time 1, i.e. takes it back to communications use and removes the data about the idle time in question from the time allocation table 25. Next, the mobile station needs to alter the earlier allocated idle time 2 and therefore it sends to the network a new idle time request IDLE_ALLOC_REQ to which it attaches the identification code 2 of the idle time to be altered and a specification V3 for the new idle time. If the new idle time V3 requested by the mobile station substantially differs from the previous allocated idle time V2' the network can, in the manner depicted in FIG. 2, first remove 210 the allocation of the previous idle time and then allocate 220 an idle time according to the new request V3.

In the example above, the idle time allocation modification message (IDLE_ALLOC_REQ) and removal message (IDLE_DISABLE) were presented as two separate messages. However, the invention is not limited to this, but the functions in question can be realised using one command, e.g. in such a way that in the modification message (IDLE_ALLOC REQ) the requested time is defined as zero when the idle time is to be deleted.

Such an arrangement with more than one idle time can be advantageously used e.g. in such a manner that the mobile station has for the whole duration of the connection at is disposal a periodically repeated short idle period and, if necessary, the mobile station can request for longer idle periods for special situations. Unlike in the example of FIG. 1, idle time requests and other messages related to idle times have to be accompanied by an identification code so as to be directed to the correct idle time allocation. The identification code may be e.g. the serial number generated by the mobile station for the idle time requests, as shown in the example of FIG. 2.

Step 110 in the example of FIG. 1, in which the network checks whether the mobile station has idle time available to it, does not limit the various embodiments of the invention. As seen from the example of FIG. 2, the network may also allocate the idle time requested by the mobile station directly, without a separate checking step.

In a preferred embodiment of the invention the network may automatically remove all existing idle time allocations in conjunction with a handover or when some other condition is met. In such an embodiment the mobile station may advantageously indicate in connection with a repeated idle time request IDLE_ALLOC_REQ that it needs the idle time in question also after a possible handover so that the network will not automatically delete the idle time in question unless so requested by the mobile station with an IDLE_DISABLE message. This function is advantageous in a case in which the mobile station regularly needs idle time e.g. to carry out an internal operation of its own or for a purpose not related to the monitoring of base stations.

The mobile station may also simply request information about possible available idle periods. In such an embodiment the network will not allocate idle time, unless specifically requested by the mobile station, but only tells the current situation. Such an embodiment is particularly well suited to be used in conjunction with packet-type communications as there occurs, depending on the traffic fluctuation, pauses in the packet-type traffic, unless it is constantly at the maximum volume.

In a preferred embodiment of the invention the network may inform the mobile station about pauses in the traffic between the network and the mobile station also without a separate request from the mobile station.

Figure 3A:
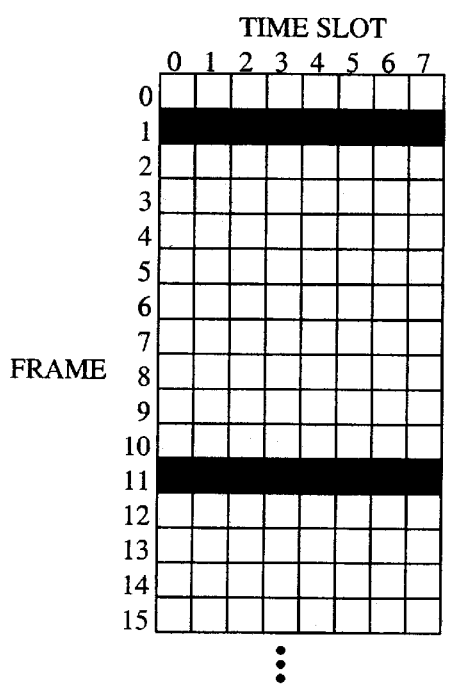
FIG. 3a shows a method of allocating idle time according to an embodiment of the invention.
Figure 3B:
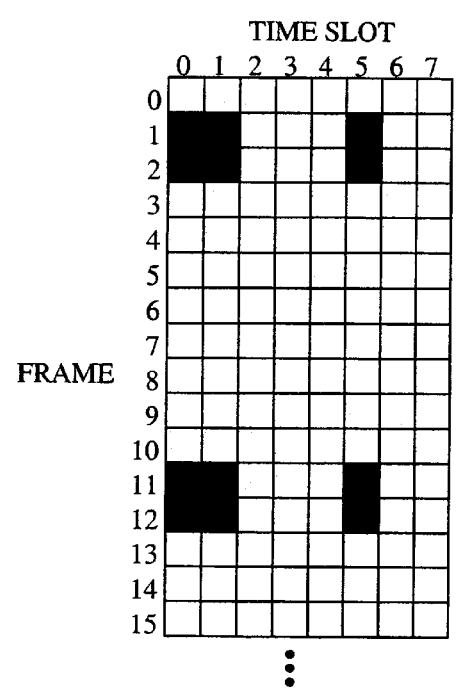
FIG. 3b shows a second method of allocating idle time according to an embodiment of the invention.

The mobile station can indicate the idle time it needs in many different ways which will be described in the paragraphs to follow and illustrated by means of FIGS. 3a and 3b. In FIGS. 3a and 3b the horizontal rows contain the frames' time slots 0 to 7 and the vertical columns the frames.

Time slots and/or frames requested idle are marked black. For example, the mobile station may indicate how many frames it needs idle during a certain period of time. In the example of FIG. 3a, the mobile station requests one idle frame at ten-frame intervals. There may be more than one frame requested idle and the length of the period may be something other than ten frames.

In the example of FIG. 3a the pause is repeated regularly every tenth frame. In a preferred embodiment of the invention the network may also arrange the frames at irregular intervals, however so that the mobile station always gets the desired number of idle frames during a certain period of time. In such an embodiment the network must indicate to the mobile station the timing of each idle frame.

The mobile station may also indicate if the pause can be allocated, advantageously from the mobile station's standpoint, in more than one parts. Thus the mobile station may request e.g. one two-frame and one three-frame pause during the next 26-frame period.

The mobile station may also request idle time in terms of time slots, e.g. by requesting certain time slots in certain frames idle. Such a request is illustrated by the example of FIG. 3b, wherein time slots 0, 1 and 5 in frames 1 and 2, 11 and 12, and so on, are marked idle. Naturally, the mobile station may also request a certain number of time slots idle in a certain unit of time without specifying the frame and the time slots in which the idle time should be located so that the network can allocate the idle time slots optimally according to the traffic situation.

In the examples of FIGS. 3a and 3b the frames are divided into eight time slots, as in the GSM system. However, the invention is not limited to this time slot division as other time slot divisions are possible in other systems. For example, the future UMTS system will probably use shorter time slots, too, whereby there may be from 16 to 64 timeslots in a frame according to some of the presently planned specifications.

In a preferred embodiment of the invention the mobile station may request the network to allocate idle time for a certain specified purpose, say, monitoring of the synchronisation signals of a certain base station specified by the mobile station. In such an embodiment the network finds out the occurrence information of the synchronisation signals of the base station specified by the mobile station, located in either the same network or another mobile communication system, and, taking into account the mobile station's capabilities, reserves the necessary amount of idle time for the moment of occurrence of the synchronisation signals and sends to the mobile station the occurrence information of the synchronisation signals in question as well as the allocated measurement time or times. Here, occurrence information refers to the frequency and timing of the synchronisation signals and the possible frequency hopping or spread spectrum code used by the synchronisation signals as well as each location in said code and possible other data needed in the monitoring of the synchronisation signals in question. Such an embodiment has the advantage that the mobile station need not inquire for the time of occurrence and frequency of the synchronisation signals of a certain base station and after that separately request idle time for the monitoring of the synchronisation signals in question, but the mobile station gets the necessary signal data and idle time by using one request.

Preferably, the network allocates to the mobile station the entire amount of time requested by the mobile station. In a congested traffic situation this, however, may not be possible, in which case the network tells the mobile station how much idle time the network was able to allocate. The network may also allocate to the mobile station more time than what was requested if, due to the size of allocation units, the network cannot allocate the exact amount of time requested by the mobile station.

The network can allocate idle time to the mobile station in many ways, such as
by swapping time slots used by mobile stations,
stealing certain bursts,
interrupting the traffic for a desired time or
forming idle frames in the connection.
These alternatives will be described in more detail in the paragraphs below.

The network, advantageously a base station communicating with the mobile station, can make arrangements between time slots used in the connections of different mobile stations. Such an arrangement is especially suitable when, from the point of view of a certain mobile station, the time best suited for the measurement of identification signals of a certain neighbour cell or certain neighbour cells does not coincide with a time slot used by the mobile station in question, but with a time slot used by another mobile station communicating with the same base station. The base station can then e.g. swap the time slots used by those two mobile stations. If necessary, the base station may also swap time slots used by more than two mobile stations.

Stealing a burst means that a certain burst is deliberately left unreceived and instead of burst reception a desired neighbour cell base station measurement is carried out, for example. Such a method naturally loses information, which limits its use. With real-time connections, which have strict requirements regarding the bit rate, allowed delays and number of errors, burst stealing substantially can be used only if the quality of the connection is good and the transmitted signal is sufficiently coded so that the increase in the bit error ratio caused by the absence of one burst will not make the bit error ratio exceed the allowed limit. With real-time connections, burst stealing can advantageously be used only if the quality of service (QoS) specified for the connection will not go below the allowed limit because of the stealing of a burst. A QoS specification typically involves the bit rate, maximum allowed delay and maximum allowed bit error ratio of the connection. Burst stealing may also be realised partially by allowing burst stealing only on non-real-time, or packet, connections. The ordinary retransmission mechanisms of packet-type communications will then cause retransmission of a stolen burst so that information will not be lost.

Burst stealing may also be realised in such a manner that the mobile station leaves at least one burst untransmitted and uses the time thus freed for other purposes. In such an embodiment the network preferably indicates to the mobile station which bursts the mobile station can leave untransmitted.

Traffic interruption can be used with non-real-time connections. The network, e.g. a base station communicating with the mobile station, can interrupt the packet stream to the mobile station for a certain period of time, thereby freeing time for the mobile station so that the mobile station can carry out measurements, for example.

The mobile station may also make a request to the network for an idle frame. During an idle frame the network will not send information to the mobile station and assumes that the mobile station will not respond to signalling or transmit information. How often the mobile station wants the idle frame to be repeated and where in the multiple frame structure are factors that have to be specified according to the system to which the mobile station wants to synchronise itself. For example, in the GSM system the idle frame is repeated every 26th frame and in the GSM/GPRS system every 13th frame. So, each mobile station can request the necessary number of idle frames for which the network may allocate the required idle time e.g. in any one of the manners described above. A base station communicating with a mobile station may advantageously maintain a table indicating each mobile station's need for idle frames.

In a preferred embodiment of the invention the mobile station indicates to the network the function set it supports, its probable traffic needs and measurement time needs or at least some of these data, when it contacts the network for the first time. The mobile station may also indicate whether it is capable of communicating with potential parallel mobile communication systems and whether it will possibly need measurement time for this. The mobile station may also indicate to the network its certain measurement-related characteristics such as
how long a time it takes the mobile station to transit to the frequency measured and to return,
how long a time it takes the mobile station to carry out certain basic measurement(s) and
the minimum time needed by the mobile station for the transition from transmission to reception and vice versa.

In a preferred embodiment of the invention the network may, in order to speed up measurements, send to the mobile station certain information related to the surroundings of the mobile station and to the beacon signals of the base stations in neighbouring cells. The network may transmit such information at regular intervals or on separate request by the mobile station. This information advantageously comprises one or more of the following items:
a list of neighbour cells,
information about different cell hierarchies,
information about nearby cells of parallel mobile communication systems,
identification data of neighbour cells,
the frequencies of the beacon signals of the neighbour cells,
the bandwidth of the beacon signals,
information about whether the beacon signal of a base station is continuous or discontinuous and if it is discontinuous, information about the occurrence times of the beacon signal and the length of the time window needed for the monitoring of the beacon signal and
a description of the occurrence of the neighbour cells' frequency and time synchronisation signals, e.g. at what frequencies and what moments of time the signals in question appear and what kind of frequency hopping or spread spectrum code the neighbour cells use and where in said code the synchronising signals are sent at each particular time.

In a preferred embodiment of the invention the network selects the information sent to the mobile station according to the function set of the mobile station. This kind of an embodiment is advantageous e.g. in a case wherein a certain geographic area has in addition to the network, a parallel mobile communication system, but a mobile station in the area in question cannot use that parallel mobile communication system. In such a situation it would be useless to send to the mobile station information about the parallel mobile communication system. Similarly, the mobile station may send to the network a request concerning only certain information according to its function set.

Figure 4:
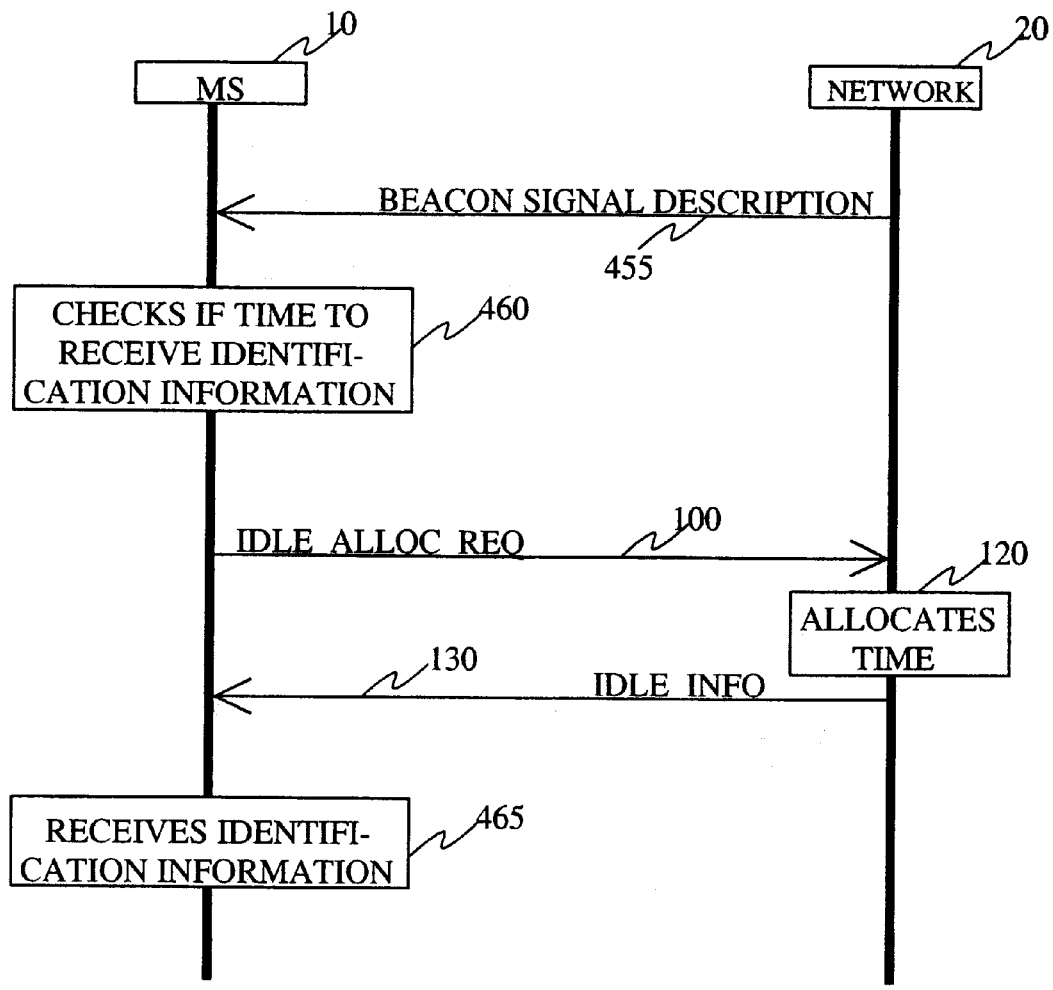
FIG. 4 shows signalling according to an embodiment of the invention.

FIG. 4 shows an example of signalling in a preferred embodiment of the invention wherein idle time is used for receiving beacon signals of base stations. In this embodiment a network 20 sends 455 to a mobile station a description of the beacon signal of a nearby base station. This description advantageously comprises information related to the beacon signal as discussed in the paragraph above. Having received the description the mobile station checks 460 whether it has time to receive the information of the beacon signal within the idle time possibly available to it. If the mobile station is unable to receive said information it sends 100 to the network a request for idle time, whereby the network provides 120 the mobile station with idle time and informs 130 the mobile station about it. Having received the information about the idle time available the mobile station listens to the base station in question for the duration of the idle time and receives 465 said identification data.

Figure 5:
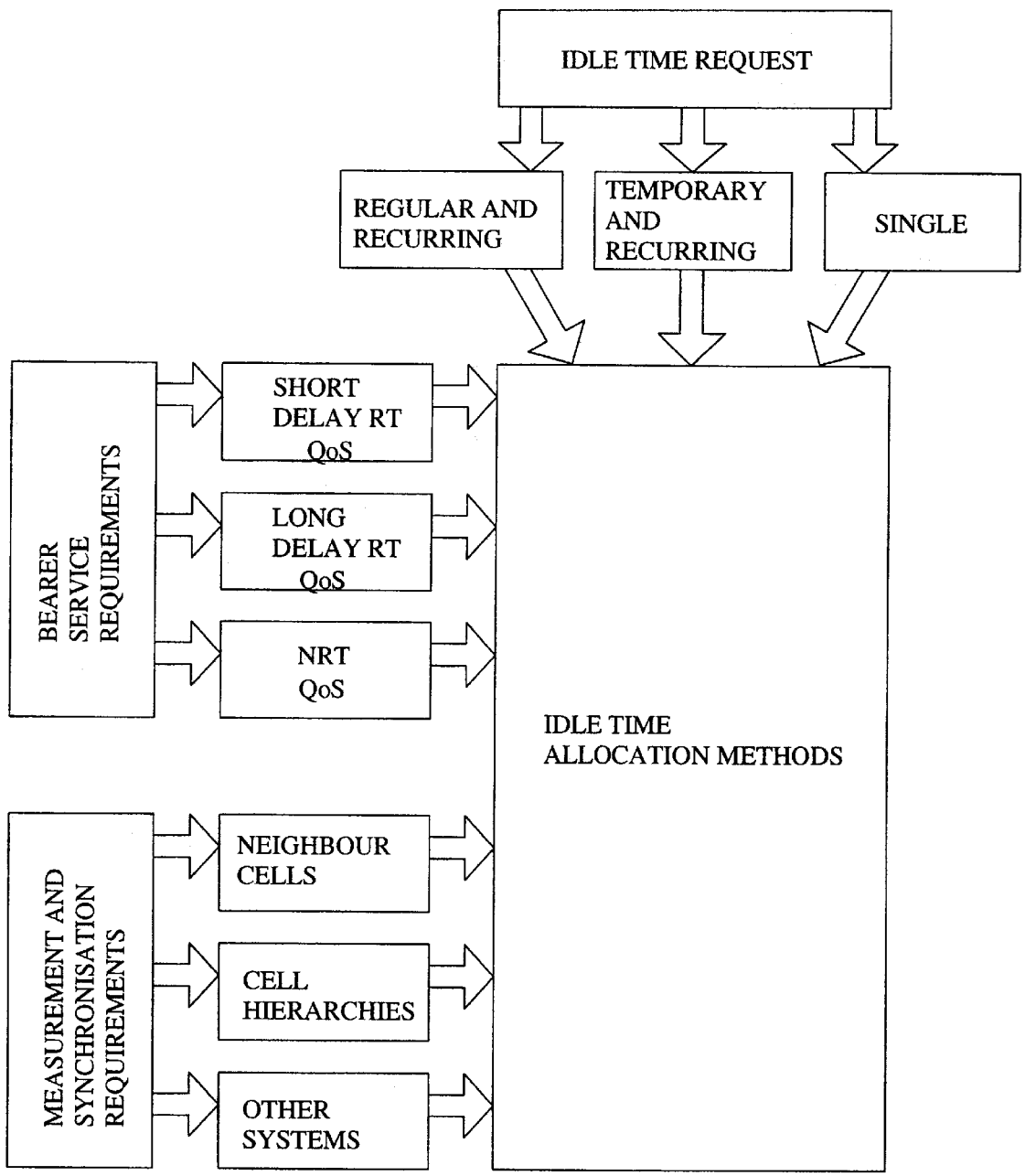
FIG. 5 shows in the form of diagram a few main factors influencing the method of arranging idle time.

For clarity, FIG. 5 shows in a diagram some of the main factors that affect the way in which the network provides a mobile station with the idle time requested by the mobile station. The diagram in FIG. 5 relates to a situation wherein a mobile station requests idle time for measurement purposes. In such an embodiment, one factor affecting the allocation of idle time naturally consists of the measurement and synchronisation requirements, e.g. how much time the mobile station needs and when. This, in turn, is influenced by the neighbour cells' synchronisation information transmission data, which were described earlier in this document. The measurements are also affected by the cell hierarchy of the mobile communication system since it has effect on the selection of potential cell candidates for a handover. Similarly, the measurement times required depend on the parallel mobile communication systems possibly available to the mobile station. A second main factor affecting the allocation of idle time consists of the selection of connections available to the mobile station and the types of the connections. If, at the present moment, the mobile station has only NRT connections, idle time can be allocated simply by momentarily interrupting the packet traffic, for example. If the base station has RT connections, the ways of allocating idle time are limited by the maximum allowed delays of the connections and other requirements of the QoS level required. A third main factor affecting the way of allocating idle time is naturally the idle time requested by the mobile station, its length and possible recurrence.

Figure 6A:
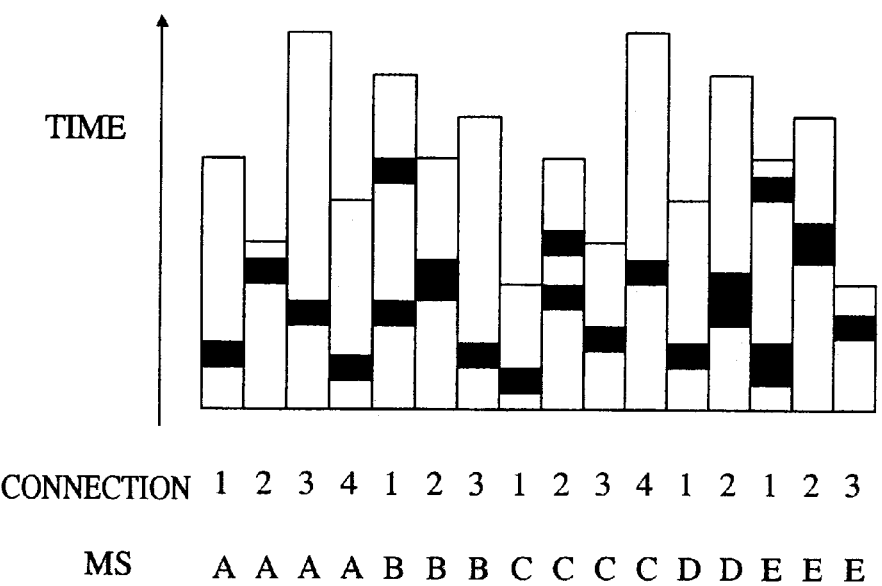
FIGS. 6a, 6b illustrate the advantages of coordinating the pauses of several connections in the case of NRT traffic.
Figure 6B:
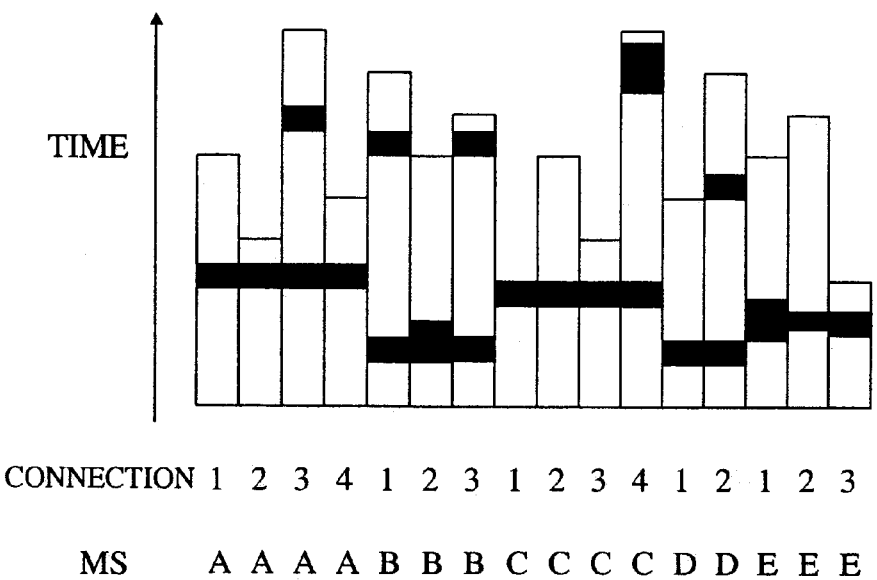

In a preferred embodiment of the invention the network coordinates pauses requested by the mobile station for different connections so that the mobile station be able to use a pause with the length of a full frame. This is illustrated in FIGS. 6a and 6b for NRT connections. FIG. 6a shows a case according to an embodiment of the invention wherein idle times requested by a mobile station and allocated for different connections are not coordinated. Such an embodiment is not very advantageous, as can be seen from FIG. 6a. In the Figure, connections of five mobile stations A, B, C, D and E are represented on the horizontal axis whereas the vertical axis represents time. Locations marked black are pauses requested by the mobile station and allocated by the network. The various connections are in this embodiment transmitted as usual in the different time slots of a frame. For example, in FIG. 6a, the pauses in the four connections of mobile station A are at least partly at different locations so that the mobile station will not have access to a frame during which it need not transmit in some time slot. FIG. 6b illustrates an embodiment of the invention more preferable than the one above wherein the network allocates pauses to all connections of each mobile station such that the pauses coincide temporally as accurately as possible. Then a mobile station will obtain idle time with the length of a full frame, during which the network will not require that the mobile station transmit information.

Figure 7:
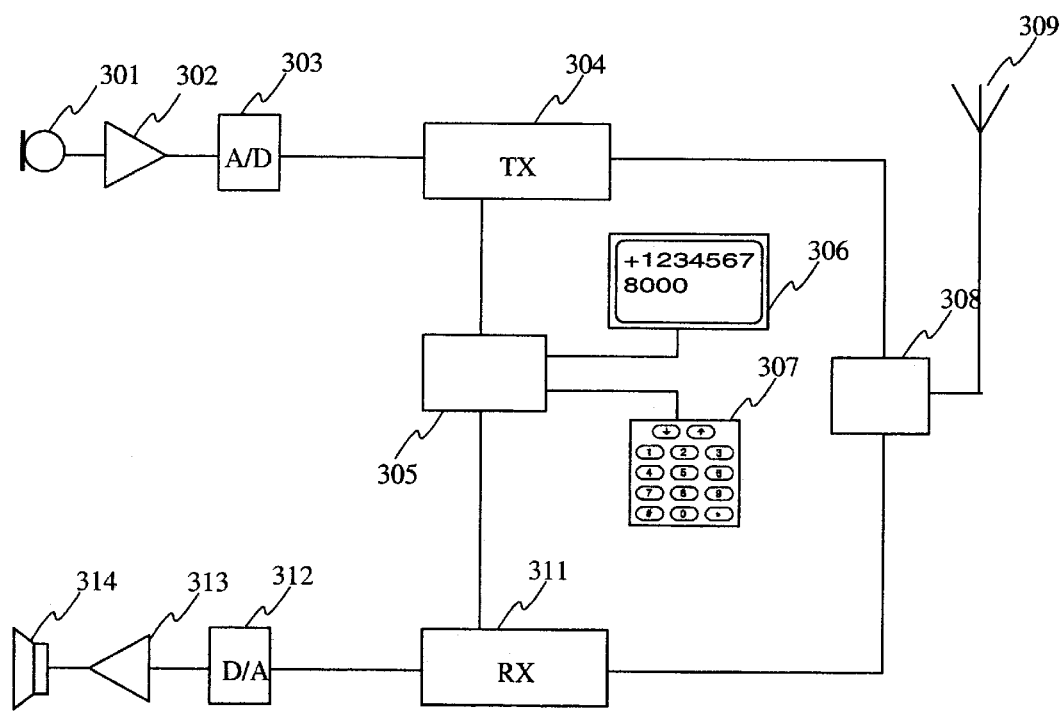
FIG. 7 shows the structure of the mobile station according to the invention.

FIG. 7 shows in the form of block diagram a mobile station according to an exemplary embodiment of the invention. The mobile station comprises parts typical of the apparatus, such as a microphone 301, keypad 307, display 306, earphone 314, transmission/reception switch 308, antenna 309 and a control unit 305. In addition, the Figure shows transmission and reception blocks 311, 304 typical of a mobile station. The transmission block 311 comprises functions related to the speech encoding, channel encoding, scrambling and modulation as well as the RF functions. The reception block comprises the corresponding RF functions as well as functions required for the demodulation, descrambling, channel decoding and speech decoding. A signal coming from the microphone 301, amplified in the amplifier stage 302 and converted to digital form in an A/D converter, is taken to the transmitter block 304, typically to a speech encoding element in the transmitter block. A signal shaped, modulated and amplified by the transmitter block is taken via the transmission/reception switch 308 to the antenna 309. A received signal is brought from the antenna via the transmission/reception switch 308 to the receiver block 311 which demodulates, descrambles and channel-decodes the received signal. The resulting speech signal is taken via a D/A converter 312 to an amplifier 313 and further to the earphone 314. The control unit 305 controls the operation of the mobile station, reads control commands given by the user on the keypad 307 and sends messages to the user by means of the display 306. The control unit 305 makes the mobile station operate in accordance with the method according to the invention. The functional elements in the control unit that realise the method according to the invention are preferably implemented as programs in the control unit's 305 processor.

Above it was described by way of example the allocation of idle time for measurement purposes. However, the invention is not limited to this but a mobile station may use idle time for other purposes as well, such as communication with another base station or other equipment. Even though the invention was above described using mainly GSM terminology and TDMA-based examples, the invention can also be applied to other types of systems, such as CDMA-based systems, for example. In one advantageous embodiment of the invention, a mobile station of the CDMA system can request idle time so that it can change its spreading code into a second one, listen to a signal transmitted by a second base station using said second spreading code and change back into using the original spreading code.

In packet communications, a mobile station can use idle time e.g. to empty the received packets buffer, thus avoiding packet buffer overflow. In such an embodiment, the mobile station can direct the idle time request only to a certain packet-type connection if the mobile station has more than one connection with the base station. A second advantageous use of idle time in packet communications is, for example, the emptying of the packet buffer in order to avoid an acknowledgement window overflow.

In a preferred embodiment of the invention the mobile station is equipped with a temperature sensor for monitoring the temperature of the processor in the mobile station, for example. If the mobile station or part of it becomes overheated, the mobile station can request the system to allocate idle time, i.e. a break in the communications, to cool down the mobile station.

Functions are being developed for future mobile communication systems by means of which a network may load new functions to a mobile station, such as new channel coding, training set, spread code set or a program defining a function required for the use of a certain new network service. The transmission of such a function-defining program across the radio path to a mobile station, its storage to the mobile station's memory and its initialisation take time so that the mobile station may need a pause in the communications, depending on the circumstances. The length of the pause essentially depends on the technical details of the mobile station, such as the writing speed of the non-volatile memory of the mobile station and the speed of the processor of the mobile station. Therefore, the network cannot allocate a certain constant pause to all the various mobile station models but the mobile station has to request a pause of the required length.

In a preferred embodiment of the invention the user may request a pause in the communications. Such an embodiment is applicable e.g. when the user and his mobile station are entering a radio shadow, such as a lift or, when travelling by car, a tunnel. The user may request a pause of a predetermined constant length or give a desired duration by means of the keypad of the mobile station or a corresponding control element. Such an embodiment has the advantage that the connection is not cut off because of the radio shadow if the user can foresee the coming situation.

In a preferred embodiment of the invention the user may also request a pause in the communications to carry out arrangement functions related to the mobile station. For example, a mobile station serving as a personal digital assistant (PDA) can be used to perform a function that requires the whole capacity of the processor of the apparatus so that if the function were carried out without interrupting the connection, it would disturb data communications and could result in data loss. In such an embodiment the user may specifically request a communications pause and then start the desired operation or, alternatively, start the desired operation directly so that prior to carrying out the operation the mobile station requests a communications pause of the required length from the network. The invention can also be realised such that the mobile station automatically requests a communications pause for such an arrangement operation without a separate control command from the user.

Figure 8:
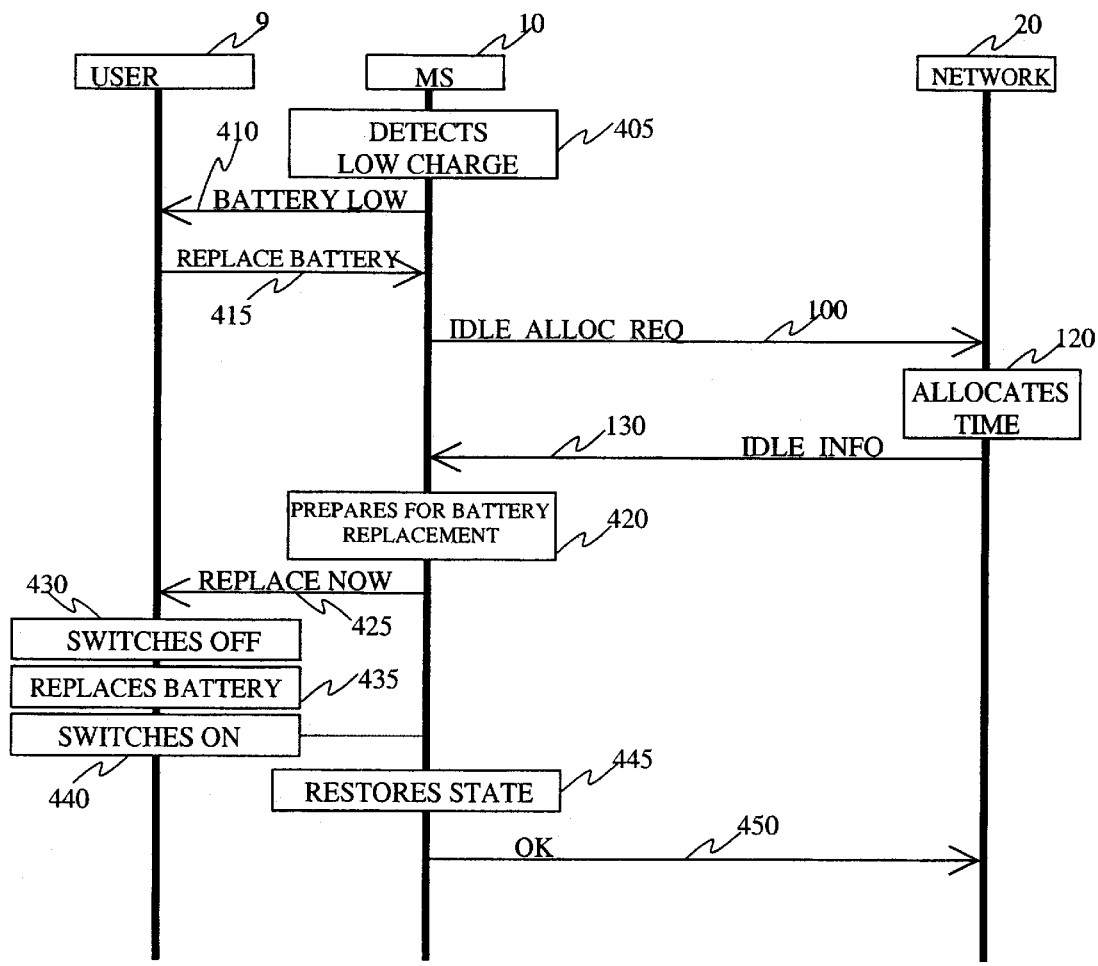
FIG. 8 shows signalling in an embodiment of the invention in which idle time is used for changing the battery of a mobile station.

In an embodiment of the invention illustrated in FIG. 8 a communications pause can be used to replace the battery. When a mobile station 10 detects 405 that the charge of the battery of the mobile station is low, it indicates 410 this to the user 9 in a known manner, e.g. by displaying a certain symbol on the mobile station's display. If the user of the mobile station has a second, charged battery he may, by means of the keypad, for example, notify 415 the mobile station about his intention to replace the battery. Then the mobile station sends to the network a request 100 for a communications pause of a duration required, which duration may be predetermined or set by the user separately at each occasion. The network provides 120 the mobile station with idle time and informs 130 the mobile station about the idle time allocated. Then the mobile station advantageously prepares 420 for the battery replacement by storing information about existing connections and other information related to the state of the mobile station into the mobile station's non-volatile memory or to a smartcard attached to the mobile station in order to speed up the recovery from the battery replacement. Having performed the necessary preparations the mobile station notifies 425 the user that he may now replace the battery. In connection with this notice the mobile station advantageously indicates how much time the user has for the battery replacement, the length of the time naturally depending on the length of the time the network was able to allocate to the mobile station. Next, the user switches off 430 the mobile station, replaces 435 the battery and switches 440 the mobile station back on or performs the battery replacement in another known manner. When the mobile station starts after the battery replacement, it fetches said information about the connections from the mobile station's memory or from a smartcard attached to the mobile station and restores on the mobile station the state that preceded the battery replacement. Finally, the mobile station advantageously indicates 450 to the network that it is ready to continue communications. This kind of an embodiment has the advantage that the battery can be replaced without disconnecting the calls even though the mobile station is switched off in conjunction with the battery replacement.

In a preferred embodiment of the invention the mobile station is arranged so as to recognise possible recurring disturbances in the down-link so that when such a disturbance occurs the mobile station can request the system to allocate idle time at the occurrence of the disturbance in order to bypass the disturbance. Such recurring disturbances typically occur e.g. in time division duplex (TDD) systems. In this kind of an embodiment the mobile station is equipped with an element which recognises a periodic disturbance and which can be advantageously realised by means of a program running in the mobile station's processor, for example. Such a program can be arranged so as to monitor e.g. the occurrence rate of transmission errors and possible regularities therein.

Above examples of the various embodiments of the invention imply that idle time is provided by the network. This, however, does not limit the invention. The invention can also be realised such that the mobile station makes an independent decision about the allocation of idle time, at least in certain situations. In such an embodiment the mobile station sends an indication to the network e.g. about the cutting-off of the connection for a certain duration, the indication advantageously comprising the same information as the above-mentioned idle time request IDLE_ALLOC_REQ, e.g. the length and moment of occurrence of the pause. The network will then interrupt the traffic for a duration indicated by the mobile station and arrange the communications of the different connections of the mobile station during the pause in a manner described above so that the communications of the connections are disturbed as little as possible. This kind of an embodiment has the advantage that e.g. in a forced situation the user can indicate by means of his mobile station that he is entering an area of poor reception. According to the prior art the connections in such a situation are terminated after certain time-out limits, which means the connections have to re-established upon leaving the shadow area, which is slow. This embodiment, however, enables the network to wait for the pause to end without disconnecting the calls so that the restoring of communications after a pause is swift.

Figure 9A:
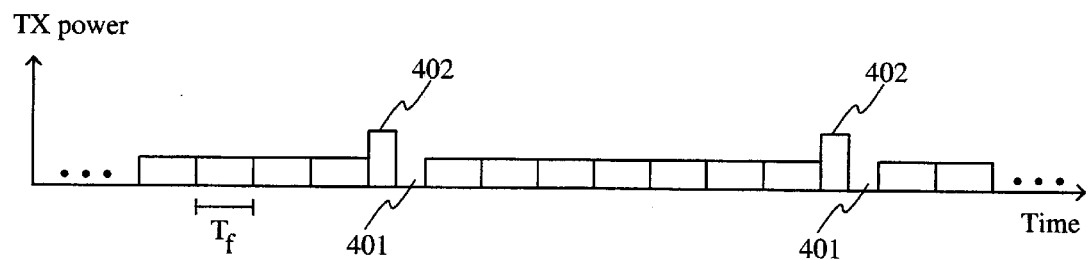
FIGS. 9a and 9b illustrate the application of the invention to CDMA based systems.
Figure 9B:
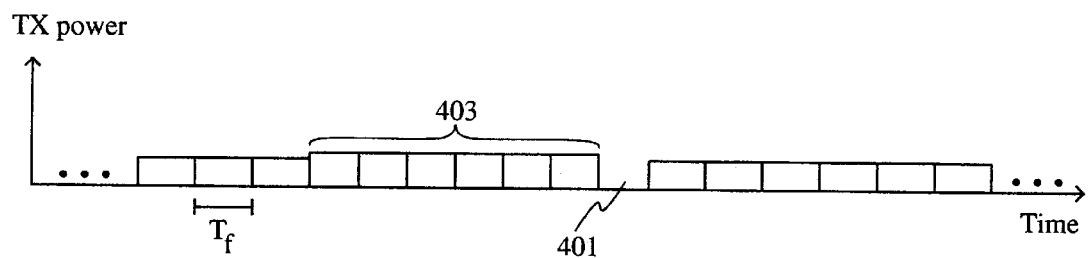

FIGS. 9a and 9b illustrate, how the invention can be applied to a CDMA system according to one advantageous embodiment of the invention. It is previously known that idle time can be arranged in a CDMA system for example as shown in FIG. 9a. The figure shows frame periods Tf, compressed frames 402 and idle periods 401. The horizontal axis of the graph corresponds to time, and the vertical to transmission power. By compressing frames in time, idle periods 401 are created. The compression may be effected for example by code puncturing or reducing of the spreading factor. The transmission power is advantageously increased for the compressed frame in order to keep the quality of the connection unaffected by the compression.

FIG. 9b shows another way to arrange idle periods 401. As FIG. 9b shows, multiple frames 403 can be compressed slightly in order to create an idle period. The compression ratio of frames in FIG. 9b is substantially smaller than in FIG. 9a, which is advantageous in some transmission modes.

The idle time arranging methods in FIGS. 9a and 9b have been suggested as to be included in the specifications of the UMTS telecommunications system. In the specifications, the arranging of idle time according to FIGS. 9a and 9b is called "slotted mode". According to the specifications, the network arranges the idle periods for example to allow the mobile station to monitor neighboring cells as in the present GSM system and/or other conventional purposes, which are known by the network. In one advantageous embodiment of the invention where the invention is applied in a CDMA based system, the mobile station requests the network to arrange one or more such idle periods 401 for any purposes, which are not known beforehand by the network. Several examples of such mobile-originated purposes and associated messaging were given previously in this application, and are not repeated here.

In this application the term mobile station means all wireless terminals, such as portable mobile phones, portable multifunction communications devices and fixed wireless terminals. The names of messages used in this application are exemplary only and are meant for illustrative purposes only.

By means of the method according to the invention a mobile communication system is able to co-operate with different mobile stations: simple mobile phones operating only in one mobile communication system and, on the other hand, mobile stations capable of versatile data communications, operating in several mobile communication systems. Then, the inclusion of simple terminals does not limit the operation of the mobile communication system and versatile and capable terminals get the most out of the mobile communication system.

Above the invention was described with reference to some of its preferred embodiments but it is obvious that the invention can be modified in many different ways in accordance with the inventive idea defined by the claims attached hereto.

What is claimed is:

1. A method for allocating idle time in a mobile communication system during a communications connection between a mobile station and a network, comprising:
   a) the mobile station sending to the network an idle time request; and
   b) the network allocating to the mobile station at least part of the idle time requested by the mobile station and informing the mobile station about at least the time when the idle time will be available.

2. The method of claim 1, further comprising:
   the mobile station additionally indicating how much idle time the mobile station needs within a certain period of time.

3. The method of claim 2, further comprising repeating b) at least once.

4. The method of claim 3, further comprising the mobile station additionally indicating to the network how many times the network will repeat b).

5. The method of claim 3, further comprising the mobile station sending to the network a command for ending or changing the repeating of a particular idle time period.

6. The method of claim 2, wherein the network allocates idle time by stealing at least one burst.

7. The method of claim 2, wherein the network allocates idle time by swapping time slots used by two or more mobile stations.

8. The method of claim 2, wherein the network allocates idle time by interrupting the communications between the mobile station and a base station of the system for a predetermined period of time.

9. The method of claim 1, further comprising the network sending to the mobile station information related to beacon signals transmitted by base stations.

10. The method of claim 9, wherein said information includes at least one of the following:
    frequencies of the beacon signal of at least one neighbour cell,
    bandwidth of the beacon signal of at least one neighbour cell,
    timing information of the beacon signal of at least one neighbour cell,
    timing information of frequency and time synchronisation signals of the beacon signal of at least one neighbour cell,
    frequency hopping or spread spectrum code information of the beacon signal of at least one neighbour cell, or
    information about the continuity or discontinuity of the beacon signal of at least one neighbour cell.

11. The method of claim 9, further comprising the mobile station sending to the network a request for said information.

12. The method of claim 1, further comprising the network sending to the mobile station information about cells of a parallel mobile communication system.

13. The method of claim 1, further comprising the network informing the mobile station of how much idle time will be available.

14. The method of claim 1, wherein the idle time is allocated by the network at selected times during periods of data exchange between the mobile station and a base station.

15. The method of claim 1, wherein the idle time is divided into a series of time intervals.

16. The method of claim 15, wherein the time intervals are distributed among various different frames of signal exchange between a base station and at least one mobile station.

17. A mobile station arranged so as to establish connections with a network comprising base stations, the mobile station comprising:
    means for the mobile station to send to the network a request for idle time, and
    means for the mobile station to receive from the network information about the allocation to the mobile station of at least a part of the idle time requested by the mobile station and at least the time when the idle time will be available.

18. The mobile station of claim 17, further comprising means for measuring a base station signal of at least one neighbour cell during said idle time.

19. The mobile station of claim 17, further comprising:
    means for receiving from the network a description of the beacon signal of a base station;
    means for determining whether the mobile station is able to receive said beacon signal during the idle time available to the mobile station; and
    means for sending to the network a request for idle time for the measurement of base station signals of neighbour cells if the mobile station is unable to receive said beacon signal.

20. The mobile station of claim 17, further comprising:
means for receiving from the user an indication of battery replacement,
means for sending to the network a request for idle time,
means for receiving from the network information about the idle time available to the mobile station,
means for storing into the memory element of the mobile station or into a memory element attached thereto information about a state of the mobile station and existing connections in order to speed up recovery from battery replacement.

21. The mobile station of claim 17, wherein the means for the mobile station to receive information also receives information concerning how much idle time will be available.

22. The mobile station of claim 17, wherein idle time is utilized during periods of data exchange between the mobile station and a base station.

23. The mobile station of claim 17, wherein the idle time is divided into a series of time intervals.

24. The mobile station of claim 23, wherein the time intervals are distributed among various different frames of signal exchange between a base station and at least one mobile station.

25. A communications network serving mobile stations, comprising:
means for receiving from at least one mobile station a request for idle time;
means for allocating, in response to the reception of said request, to the mobile station at least part of the idle time requested by the mobile station; and
means for sending to the mobile station information about at least when the idle time will be available to the mobile station.

26. The communication network of claim 25, wherein the means for sending information also sends information concerning how much idle time will be available.

27. The communication network of claim 25, wherein the idle time is allocated by the network at selected times during periods of data exchange between the mobile station and a base station.

28. The communication network of claim 25, wherein the idle time is divided into a series of time intervals.

29. The communication network of claim 28, wherein the time intervals are distributed among various different frames of signal exchange between a base station and at least one mobile station.

30. A method for allocating idle time in a mobile communication system during a communications connection between a mobile station and a network, comprising:
the mobile station sending to the network an idle time request;
the network allocating to the mobile station at least part of the idle time requested by the mobile station and informing the mobile station of the idle time available; and
the mobile station additionally indicating to the network how many times the network will repeat said allocating idle time and informing of the idle time.

31. A method for allocating idle time in a mobile communication system during a communications connection between a mobile station and a network, comprising:
the mobile station sending to the network an idle time request;
the network allocating to the mobile station at least part of the idle time requested by the mobile station by swapping time slots used by two or more mobile stations; and
the network informing the mobile station of the idle time available.

32. A mobile station arranged so as to establish connections with a network comprising base stations, said mobile station comprising:
means for receiving from the user an indication of battery replacement;
means for sending to the network a request for idle time;
means for receiving from the network information about the idle time available to the mobile station; and
means for storing into a memory element of the mobile station or into a memory element attached to the mobile station, information about a state of the mobile station and existing connections in order to speed up recovery from battery replacement.

* * * * *